United States Patent [19]

Stott

[11] 4,448,628

[45] May 15, 1984

[54] SEGMENTAL MANDREL FOR MAKING WOUND FILAMENT STRUCTURES

[76] Inventor: Rexeene S. Stott, 123 W. 4th N., Brigham City, Utah 84302

[21] Appl. No.: 398,133

[22] Filed: Jul. 14, 1982

[51] Int. Cl.³ .................. B29C 1/13; B28B 21/48; B28B 21/64
[52] U.S. Cl. ..................... 156/425; 29/124; 249/184
[58] Field of Search ............ 249/175, 177, 184; 29/124, 110, 116 R; 242/115; 156/425, 173

[56] References Cited

U.S. PATENT DOCUMENTS

| | | | |
|---|---|---|---|
| 856,852 | 6/1907 | Dorward | 249/177 |
| 1,001,500 | 8/1911 | Blayney | 249/177 |
| 1,155,304 | 9/1915 | Dunham | 29/124 |
| 1,208,593 | 12/1916 | Lyon | 249/175 |
| 1,257,924 | 2/1918 | Pearne et al. | 249/184 |
| 1,535,023 | 4/1925 | Kelley | 249/1 |
| 2,529,637 | 11/1950 | Sonnett et al. | 249/186 |
| 2,596,554 | 5/1952 | Hoff | 29/124 |
| 2,621,033 | 12/1952 | Blythe | 29/124 |
| 2,808,097 | 10/1957 | Martin | 156/425 |
| 3,165,789 | 1/1965 | Jackson | 249/61 |
| 3,167,800 | 2/1965 | Mundo | 29/124 |
| 3,357,875 | 12/1967 | Corbin | 156/425 |
| 3,579,422 | 5/1971 | Minick et al. | 156/169 |
| 3,652,024 | 3/1972 | Setnik | 156/425 |
| 3,669,401 | 6/1972 | Nevarez | 249/134 |
| 3,729,165 | 4/1973 | Trimble | 249/1 |

Primary Examiner—Willard E. Hoag
Attorney, Agent, or Firm—Donald J. Singer; Charles E. Bricker

[57] ABSTRACT

A reuseable mandrel for fabricating large hollow shells, such as missile casings or storage tanks, which comprises a plurality of longitudinal sector pieces, a center shaft and means for supporting the sector pieces in concentric relation to the shaft. The sector pieces, shaft and spacing means can be easily disassembled from the interior of a casing which is assembled over the madrel.

9 Claims, 7 Drawing Figures

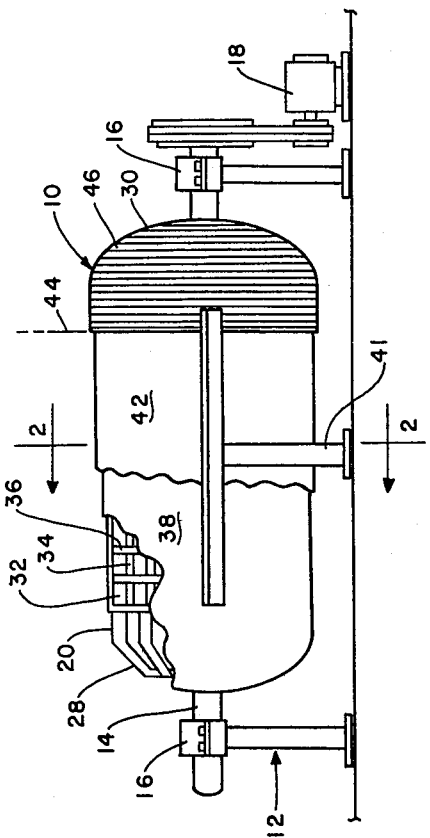

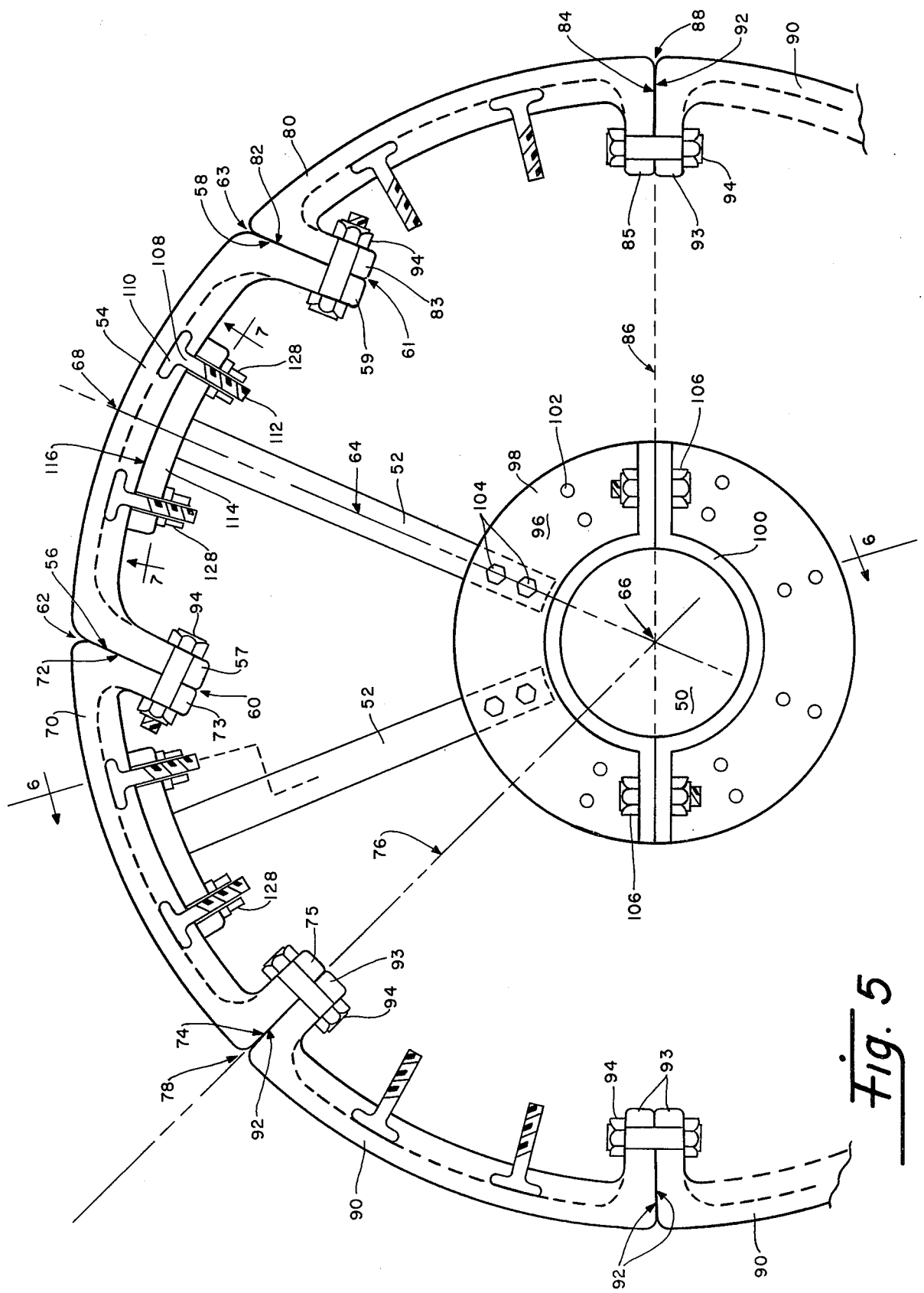

SEGMENTAL MANDREL FOR MAKING WOUND FILAMENT STRUCTURES

RIGHTS OF THE GOVERNMENT

The invention described herein may be manufactured and used by or for the Government of the United States for all governmental purposes without the payment of any royalty.

BACKGROUND OF THE INVENTION

This invention relates to mandrels on which hollow shells or casings are formed.

Mandrels are frequently used to form relatively thin casings for fuel in missiles. The casings are generally formed by winding a filamentary material impregnated with a plastic resin onto the mandrel.

The mandrels are generally hollow and are usually fabricated from a frangible plaster-like material which must be strong, lightweight and capable of maintaining an extremely accurate outer surface as the filaments are wound thereon under tension. After the casing has been wound and cured, the mandrel must be broken up and removed through the ports normally provided in at least one end of the case. Removal of the mandrel must be done without damaging or distorting the relatively thin casing. Since the mandrel must have a solid wall of substantial thickness and density in order to have adequate strength during the winding operation, the subsequent breaking up of the mandrel requires painstakingly careful chiseling to break the mandrel into pieces of a size which can be removed through a porthole, and at the same time not damage or in any way detract from the contour accuracy of the outer shell.

It is an object of this invention to provide an improved hollow mandrel.

Other objects and advantages of the present invention will be apparent to those skilled in the art from a consideration of the following disclosure.

SUMMARY OF THE INVENTION

In accordance with the present invention there is provided an improved, nondestructible mandrel comprising a center shaft, a plurality of longitudinal sector pieces assembled in edge-to-edge relationship to define the periphery of the mandrel and means for holding the mandrel in spaced, equidistant relation from the shaft. Inasmuch as the casing is assembled over the mandrel the sector pieces, shaft and spacing means can be easily disassembled from the interior of the completed casing.

BRIEF DESCRIPTION OF THE DRAWINGS

In the drawings,

FIG. 1 is a side elevation, partly broken away, showing a mandrel employed in the prior art;

FIG. 2 is a cross section through 2—2 of FIG. 1;

FIG. 5 is an enlarged, partial cross section through 5—5 of FIG. 3;

FIG. 6 is a plan view, partly in section, taken along 6—6 of FIG. 5; and

DETAILED DESCRIPTION OF THE DRAWINGS

Figure 3:
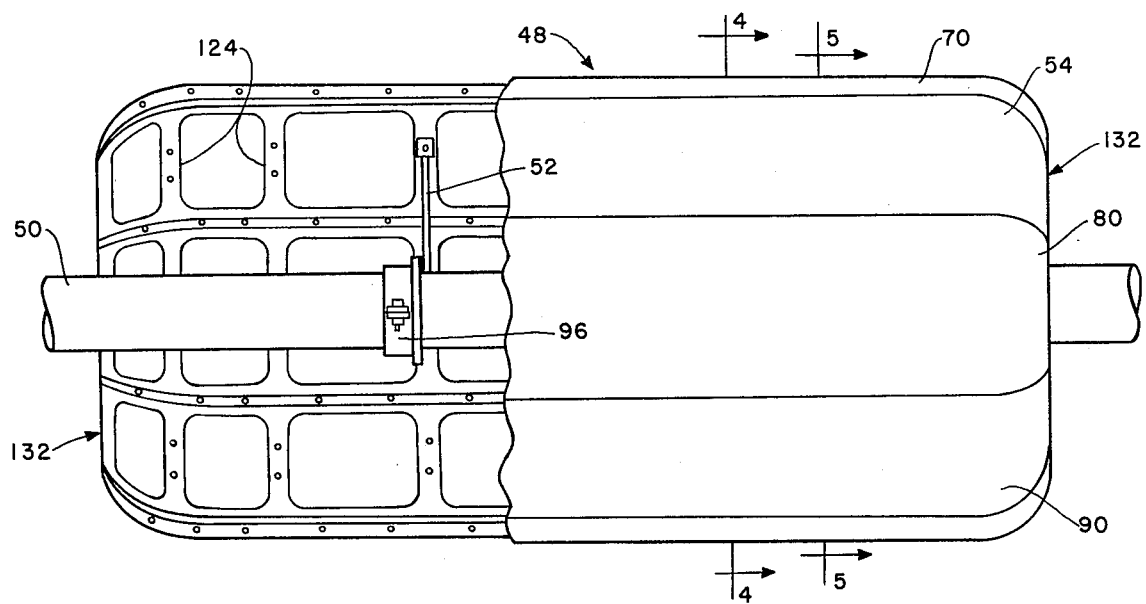
FIG. 3 is a side elevation, partly broken away, showing the mandrel of this invention.
Figure 4:
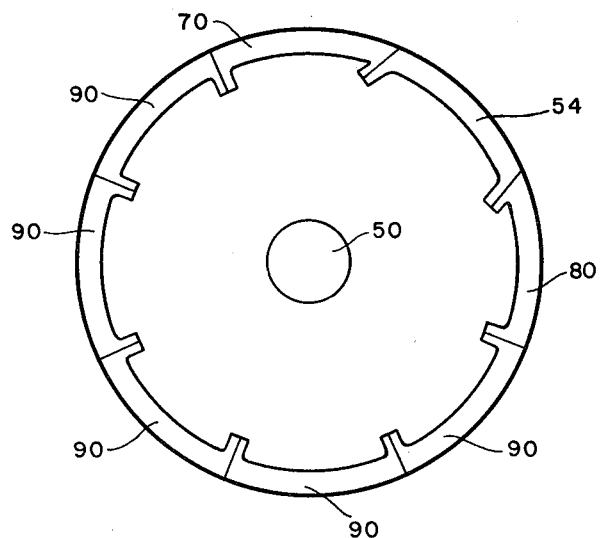
FIG. 4 is a cross section through 4—4 of FIG. 3.

FIGS. 1 and 2 illustrate a mandrel, designated generally by the reference numeral 10, mounted for rotation in a lathe, designated generally by the reference numeral 12. The mandrel is carried on a central shaft 14. The shaft 14 is journaled in bearings 16 and operatively connected to a motor drive 18.

The mandrel 10 comprises a plurality of longitudinally aligned ribs 20, with only a few representative ribs being shown. The ribs 20 are supported by a plurality of spokes 22. The spokes 22 are demountably connected at one end, as at 24, to the shaft 14, and at the opposite end, as at 26, to the ribs 20.

The rib 20 are linear over a substantial portion of their length and have curved ends 28 to conform to the curved ends 30 of mandrel 10. The ribs 20 may be continuous from end to end, or may be segmented.

In the prior art, the mandrel 10 is formed by first winding layer of burlap 32, or other inexpensive, disposable material over the ribs 20. Longitudinal cables 34 and circumferential cables 36 are placed over the burlap 32. A layer 38 of a frangible material, preferably a low expansion plaster material, is placed over the burlap 32 and cable layers 34 and 36. Template 40, supported by template rest 41, is employed to accurately shape the outer circumference of mandrel 10.

After the frangible layer 38 has set or cured, an insulation layer 42 is applied over the layer 38. A high strength reinforcing cord 44, such as fiberglass or an aromatic polyamide, impregnated with a suitable resin, such as polyester or epoxy, is wound onto the mandrel 10 over the insulation layer 42 in a usual and well-known manner to form the casing or shell 46. The shell 46 is then cured by conventional methods.

When the shell 46 has cured, the operation of breaking up and removing the mandrel comprises reaching into the assembly through a porthole and removing the spokes 22, shaft 14 and ribs 20, and thereafter removing the frangible layer 38. A portion of the layer 38 is loosened by pulling out the cables 34 and 36. Any remaining material must be chiseled away by hand. While breaking and removing such remaining material, the insulation layer 42 often sustains damage which must be repaired.

The improved mandrel of this invention, shown in FIGS. 3–designated generally by reference numeral 48, comprises a center shaft 50, a plurality of spokes 52 and a plurality of longitudinal sector pieces which are assembled to define the periphery of the mandrel 48. These sector pieces are edge-joined inside the mandrel 48. Inasmuch as a casing or shell is fabricated over the mandrel, the mandrel is disassembled from inside the completed shell. Thus, the mandrel 48 comprises a first sector piece 54 having spaced-apart edges 56 and 58, defined by inwardly directed flanges 57 and 59, respectively. The first sector piece 54 has a keystone cross section with the inner lateral dimension, indicated by reference numerals 60 and 61, at least equal to the outer lateral dimension, indicated by reference numerals 62 and 63. When the inner dimension 60/61 is equal to the outer dimension 62/63, it is preferred that the edge planes defined by the edges 56 and 58 be equidistant from and parallel to the imaginary plane 64 passing through the central longitudinal axis 66 of mandrel 48 and the peripheral midpoint 68 of sector 54. The inner dimension 60/61 may be greater than the outer dimension 62/63 by up to about 10%, preferably no greater than about 5%.

A second sector piece 70 abuts the first sector piece 54 and has a first edge 72, defined by flange 73, complementary to the edge 56 of piece 54. The second edge 74 of piece 70, defined by flange 75, lies in the imaginary plane 76 passing through the outermost point 78 of edge 72 and the central axis 66. A third sector piece 80 abuts the first sector piece 54 and has a first edge 82, defined by flange 83, complementary to edge 58 of piece 54. The second edge 84 of piece 80, defined by flange 85, lies in the imaginary plane 86 passing through the outermost point 88 of edge 84 and the central axis 66. The remaining sector pieces 90 have edges 92, defined by flanges 93, which are complementary to edges 74 and 84 of pieces 70 and 80, respectively. The various edges pieces are joined in edge-to-edge relation by bolt-washer-nut combinations 94.

The various sector pieces are supported in concentric relation with the center shaft 50 by a plurality of spokes 52. The spokes 52 are secured to shaft 50 through a plurality of split flange ring assemblies 96. Each matching half of flange ring 96 has a radial portion 98 and a clamping portion 100. Each radial portion 98 has a plurality of holes 102 through which bolts 104 may be passed for securing the spokes 52 to the flange ring 96. In the clamping portion 100 are aligned holes for passing bolts 106 therethrough for securing two flange ring halves together and for clamping same to the shaft 50.

Figure 7:
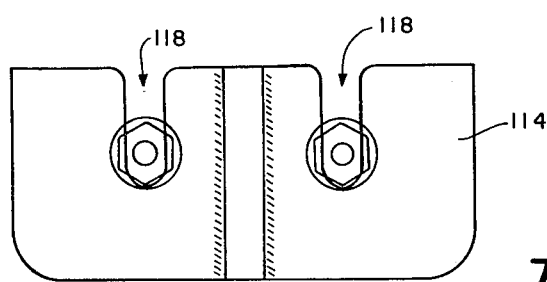
FIG. 7 is a plan view taken along 7—7 of FIG. 5.

Referring now to FIGS. 5-7, each of the sector pieces 54, 70, 80 and 90 has at least one threaded stud 108 with anchor portion 110 embedded in the sector piece and threaded portion 112 extending inwardly therefrom. The spokes 52 have an enlarged head portion 114 which has an arcuate surface 116 to fit the inner curved surface of each of the various sector pieces. Each head portion 114 has at least one elongated slot 118 spaced for alignment with stud 108. The tail end of each spoke 52 has a plurality of holes 120 aligned with the holes 102 in flange ring 96.

As shown in FIG. 6, in particular, each sector piece has a minimum thickness 122. Although the thickness 122 may be sufficient to embed the studs 108, it is preferable to provide radial portions 124 having a greater thickness 126 for embedding the studs 108. As shown in FIG. 3, when the various sector pieces are assembled around the shaft 50, the radial portions 124 of each sector piece cooperate to define a circumferential reinforcing ring.

The mandrel 48 may be assembled as follows: assemble four sector pieces 90 in edge-to-edge relation using the bolt-washer-nut combinations 94 to secure these pieces together. Insert the required number of spokes 52, passing the slots 118 of the spoke head 114 around the threaded portions 112 of studs 108 and securing the spokes 52 in place with a washer and nut 128. Install one-half of a split flange ring assembly 96 at each desired axial location using bolts 104 to secure the spokes 52 to the half of assembly 96. Assemble one of each of sector pieces 54, 70, 80 and 90 with spokes 52 and ring assembly halves 96 in the same manner, thereby assembling two half-mandrel subassemblies.

The shaft 50 is thereafter positioned in one of the subassemblies and the second subassembly is positioned over the first. The halves of the ring assemblies are joined using bolts 106 and the remaining sector pieces are joined in edge-to-edge relation. The assembled mandrel 48 has open ends 132, as indicated in FIG. 3.

Once assembled, there may be small axial grooves between adjacent sector pieces, as indicated, for example, at 63 between sector pieces 54 and 80 in FIG. 5. In order to provide a smooth, unblemished surface upon which to fabricate a casing or shell, as described previously, the grooves 63 may be filled with a suitable frangible material, such as plaster, wallboard crack filler, or the like, then sanded smooth after the material has hardened.

A casing or shell is fabricated over the mandrel 48 in the manner hereinbefore described. That is, an insulation layer is applied over the mandrel, then a high strength reinforcing cord impregnated with a suitable resin is wound over the insulation layer. The shell is then cured by conventional methods.

When the shell is cured at least to the point that it is selfsupporting, the mandrel 48 is removed, as follows: first, the spokes 52 supporting the sector piece 54 are removed by loosening the nuts 128 securing the spokes to the sector piece and removing the bolts 104 which secure the spokes to the flange rings 98. The bolt assemblies 94 which secure the sector piece 54 to adjacent sector pieces are removed and the sector piece 54 is pulled inwardly, then passed out through the open end 132. The remaining sector pieces above the shaft 50 are removed in similar fashion. The shaft 50 is then removed and thereafter all remaining components of the mandrel are removed.

The various sector pieces 54, 70, 80 and 90 may be made of any suitable material, preferably a high strength thermosetting plastic material reinforced with a suitable reinforcing material. The sector pieces may be fabricated in conventional manner using a male or female mold, or both. Fabrication may be done by hand layup using woven reinforcing material or by spraying chopped reinforcement together with resin onto or into the mold.

As discussed previously, the apparatus of this invention may be used to fabricate a missile casing or shell. The apparatus may also be used to fabricate large cylindrical tanks such as below ground fuel tanks, upright silos, vehicular tanks for conveying granular or liquid materials and the like.

Various modifications may be made in the present invention without departing from the spirit thereof or the scope of the accompanying claims.

I claim:

1. A hollow mandrel for forming a reinforced shell therearound, said mandrel having a right cylinderical body with domed end portions and a central longitudinal axis, which comprises:
    a. a center shaft adapted for mounting for rotation in a lathe:
    b. a plurality of longitudinal sector pieces demountably assembled in edge-to-edge relationship to define the periphery of said mandrel each sector piece including a sector section of said right cylinderical body and sector sections of said domed end portions;
    c. means for supporting said sector pieces in concentric relation to said center shaft;
    d. means for demountably securing said supporting means to said sector pieces; and
    e. means for demountably securing said supporting means to said shaft;
    wherein a first one of said sector pieces has spaced-apart edges defined by inwardly directed flanges wherein the inner lateral dimension of said first sector piece is at least equal to the outer lateral dimension of said first sector piece;

wherein a second and a third sector piece each have a first edge defined by an inwardly directed flange complementary to the adjacent edge of said first sector piece, and each have a second edge defined by an inwardly directed flange complementary to the edges of the remaining sector pieces; and wherein all remaining sector pieces have spaced-apart edges defined by inwardly directed flanges, said edges lying in the plane passing through said central axis each said means for supporting being a spoke removably attached to said shaft, and being removably attached to section piece by plural studs generally radially disposed relative said shaft in such a manner that said spoke can be detached from said section piece by movement of said spoke axially of said shaft and laterally of said studs.

2. The mandrel of claim 1 wherein said inner lateral dimension of said first sector piece is equal to the said outer lateral dimension.

3. The mandrel of claim 1 wherein said inner lateral dimension of said first sector piece is about 10% greater than said outer lateral dimension.

4. The mandrel of claim 1 wherein said inner lateral dimension of said first sector piece is about 5% greater than said outer lateral dimension.

5. The mandrel of claim 1 wherein said sector pieces are fabricated of a high strength thermosetting plastic material reinforced with a reinforcing material.

6. The mandrel of claim 5 wherein the domed end portion sections are integral with the right cylindrical section of said sector pieces.

7. The mandrel of claim 1 wherein said supporting means comprises a plurality of individual spokes.

8. The mandrel of claim 7 wherein said means for securing said spokes to said sector pieces comprise threaded studs, each one having an anchor portion embedded in said sector piece and wherein each of said spokes has an enlarged head portion adapted to fit the inner contour of said sector pieces, said enlarged head portion having an elongated slot adapted to fit around said stud.

9. The mandrel of claim 7 wherein said means for securing said spokes to said shaft comprise split flange ring assemblies, each assembly having a radial portion adapted for securing said spokes thereto, and a clamping portion for clamping said ring assemblies to said shaft.

* * * * *